US012404724B2

(12) United States Patent
Johnson et al.

(10) Patent No.: US 12,404,724 B2
(45) Date of Patent: Sep. 2, 2025

(54) LADDER STABILIZER ATTACHMENT DEVICE

(71) Applicant: Bighorn Products, LLC, Salem, SD (US)

(72) Inventors: Benjamin Johnson, Salem, SD (US); Chad Johnson, Salem, SD (US); Les Slunecka, Sioux Falls, SD (US)

( * ) Notice: Subject to any disclaimer, the term of this patent is extended or adjusted under 35 U.S.C. 154(b) by 918 days.

(21) Appl. No.: 17/565,105

(22) Filed: Dec. 29, 2021

(65) Prior Publication Data

US 2023/0203889 A1 Jun. 29, 2023

(51) Int. Cl.
*E06C 7/00* (2006.01)
*E06C 7/48* (2006.01)
*E06C 7/06* (2006.01)

(52) U.S. Cl.
CPC .............. *E06C 7/488* (2013.01); *E06C 7/486* (2013.01); *E06C 7/06* (2013.01)

(58) Field of Classification Search
CPC . E06C 7/488; E06C 7/486; E06C 7/06; E06C 7/188; E06C 7/48; E06C 7/182
USPC .................................... 182/21, 106, 107, 122
See application file for complete search history.

(56) References Cited

U.S. PATENT DOCUMENTS

| | | | | |
|---|---|---|---|---|
| 2,140,828 | A * | 12/1938 | Carle | E06C 1/36 248/214 |
| 4,311,209 | A | 1/1982 | Primerano | |
| 5,012,895 | A | 5/1991 | Santos | |
| 7,322,442 | B2 * | 1/2008 | Clark | E06C 7/182 182/106 |
| 9,593,531 | B2 | 3/2017 | Ballard | |
| 11,913,283 | B2 * | 2/2024 | MacKarvich | E06C 7/48 |
| 2008/0190692 | A1 * | 8/2008 | Feik | E06C 7/182 182/107 |
| 2011/0011676 | A1 | 1/2011 | DeLair | |
| 2016/0215563 | A1 * | 7/2016 | Ellis | E06C 1/04 |
| 2020/0224495 | A1 * | 7/2020 | Johnson | E06C 7/486 |
| 2020/0248507 | A1 * | 8/2020 | Moss | E06C 7/182 |
| 2024/0183221 | A1 * | 6/2024 | Miner | E06C 1/08 |

FOREIGN PATENT DOCUMENTS

| | | |
|---|---|---|
| CN | 10110511 | 5/2010 |
| CN | 201934004 | 8/2011 |
| CN | 1077191131 | 9/2017 |
| GB | 2459118 | 10/2009 |
| JP | 2008285967 | 11/2008 |
| WO | WO-2017031523 A1 * | 3/2017 |

* cited by examiner

*Primary Examiner* — Janet M Wilkens

(57) ABSTRACT

A ladder stabilizer attachment device secures a ladder stabilizer to a ladder. The device includes a sleeve including an outer wall. The outer wall has an outer face, an inner face, an upper end, and a lower end. The lower end is open. A slot extends into the inner face from the lower end to receive a top end of a ladder side rail and an uppermost rung of the ladder into the slot. A top edge of the slot defines a stop whereby the stop rests upon the uppermost rung of the ladder. A coupler is mounted to the sleeve. The coupler releasably engages the uppermost rung of the ladder.

17 Claims, 6 Drawing Sheets

LADDER STABILIZER ATTACHMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to ladder stabilizing device and more particularly pertains to a new ladder stabilizing device for securing a ladder stabilizer to a ladder.

(2) Description of Related Art Including Information Disclosed Under 37 CFR 1.97 and 1.98

The prior art relates to ladder stabilizing devices. Known prior art attaches to rungs or rails but provide for attachment in a manner which would benefit from improved stabilization and inhibition of movement during use.

BRIEF SUMMARY OF THE INVENTION

An embodiment of the disclosure meets the needs presented above by generally comprising a sleeve including an outer wall. The outer wall has an outer face, an inner face, an upper end, and a lower end. The lower end is open. A slot extends into the inner face from the lower end to receive a top end of a ladder side rail and an uppermost rung of the ladder into the slot. A top edge of the slot defines a stop whereby the stop rests upon the uppermost rung of the ladder. A coupler is mounted to the sleeve. The coupler releasably engages the uppermost rung of the ladder.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
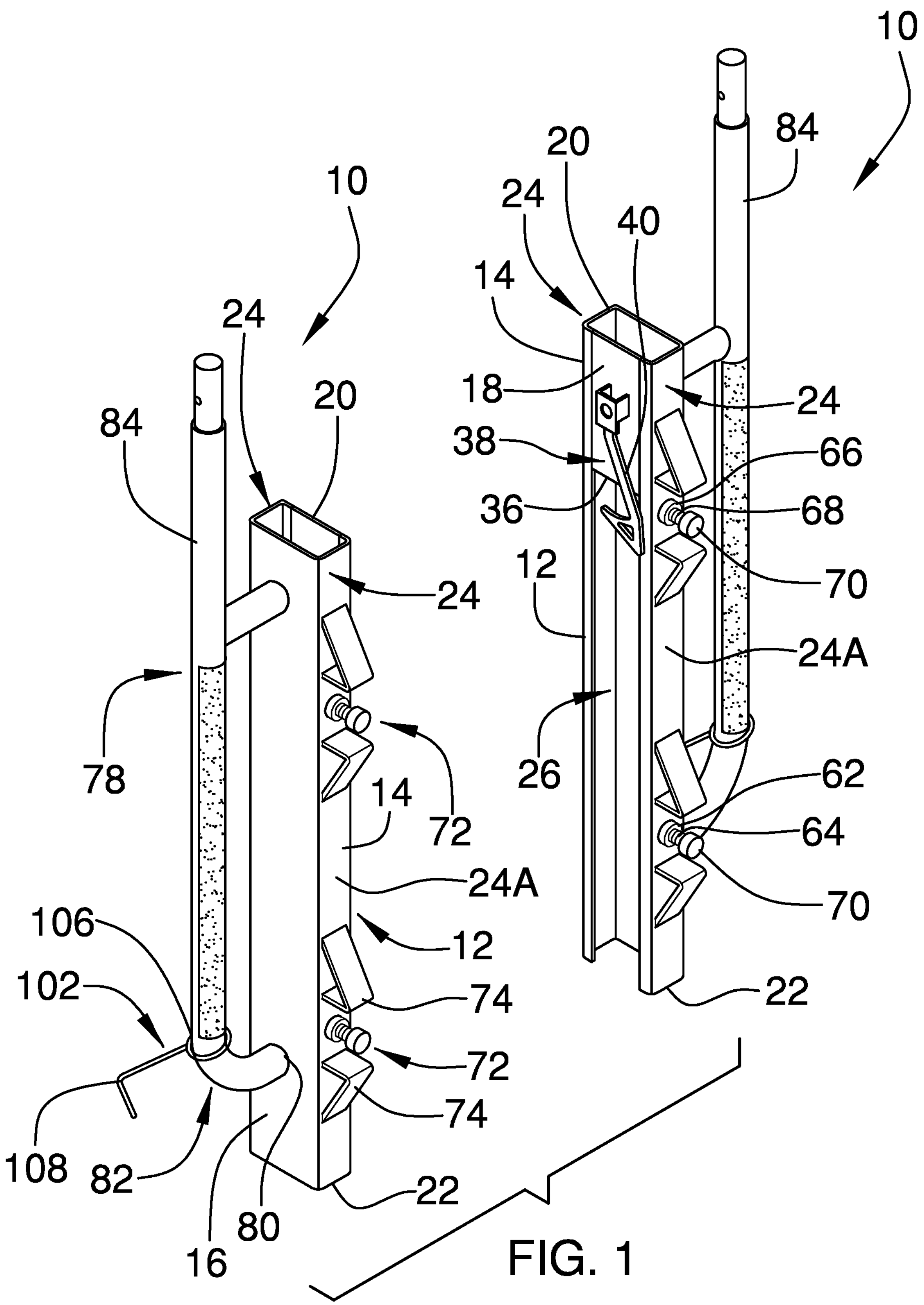
FIG. 1 is a top front side perspective view of a pair of ladder stabilizer attachment devices according to an embodiment of the disclosure.
Figure 2:
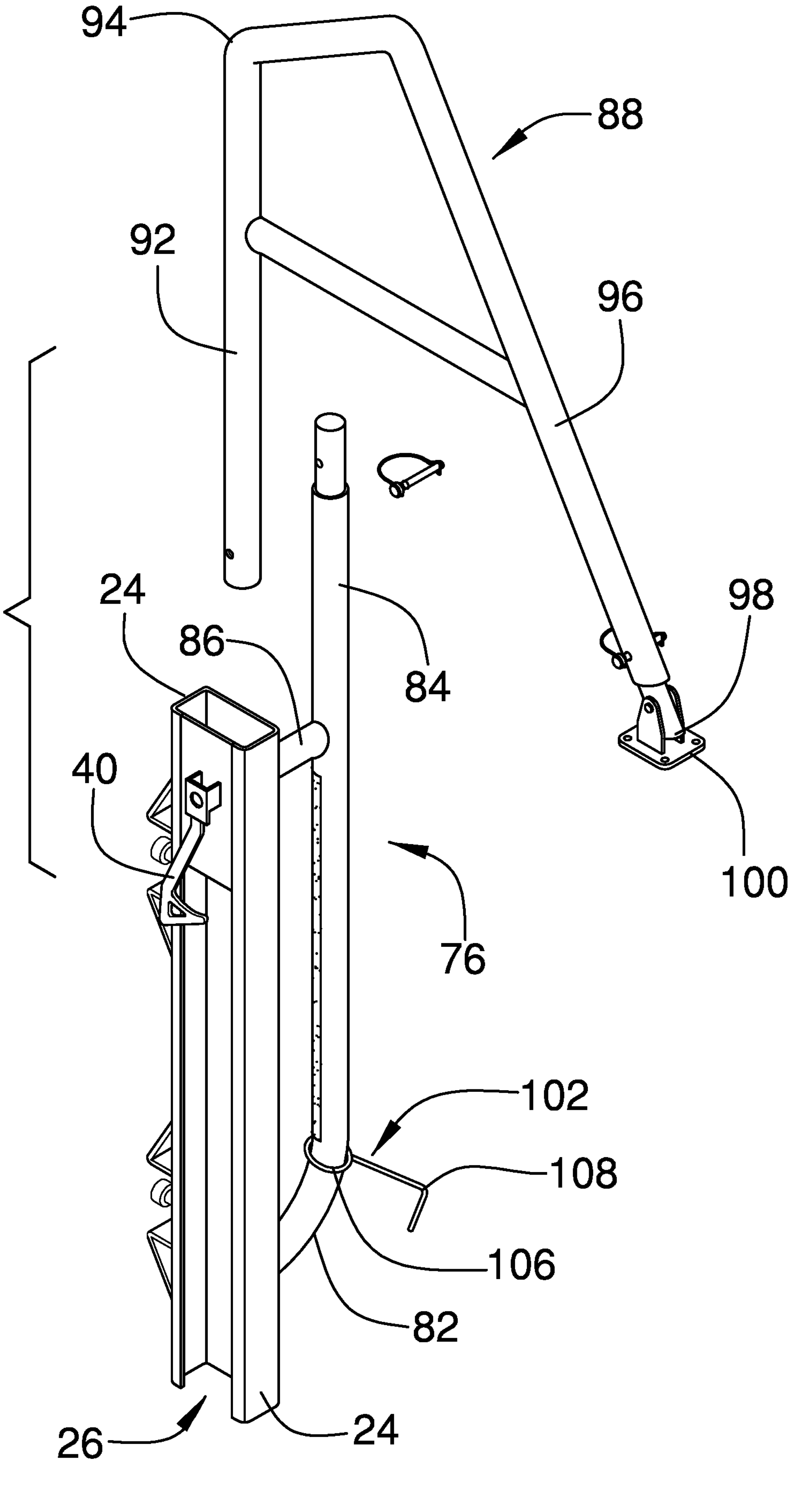
FIG. 2 is an exploded top front side perspective view of an embodiment of the disclosure.
Figure 3:
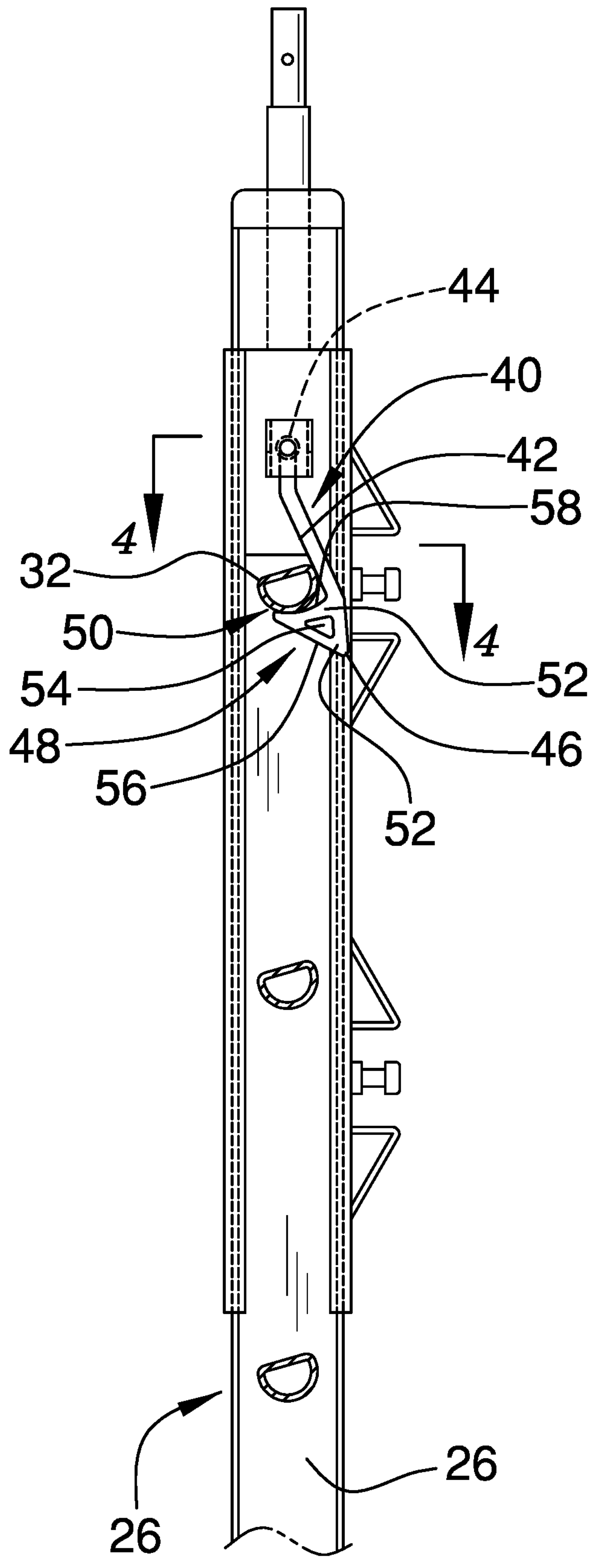
FIG. 3 is a partial cut-away side view of an embodiment of the disclosure attached to a ladder.
Figure 4:
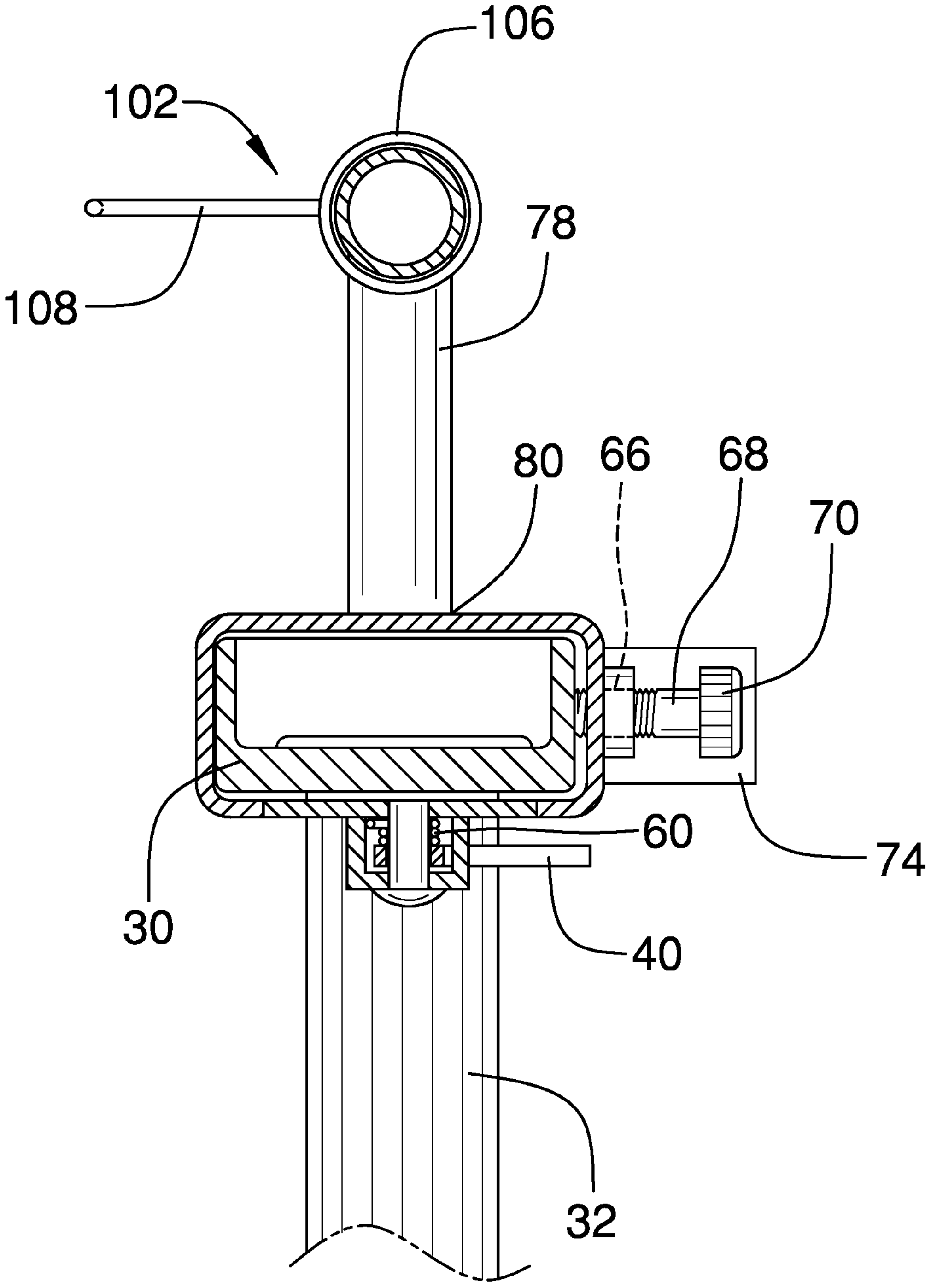
FIG. 4 is a cross-sectional view of an embodiment of the disclosure taken along line 4-4 of FIG. 3.
Figure 5:
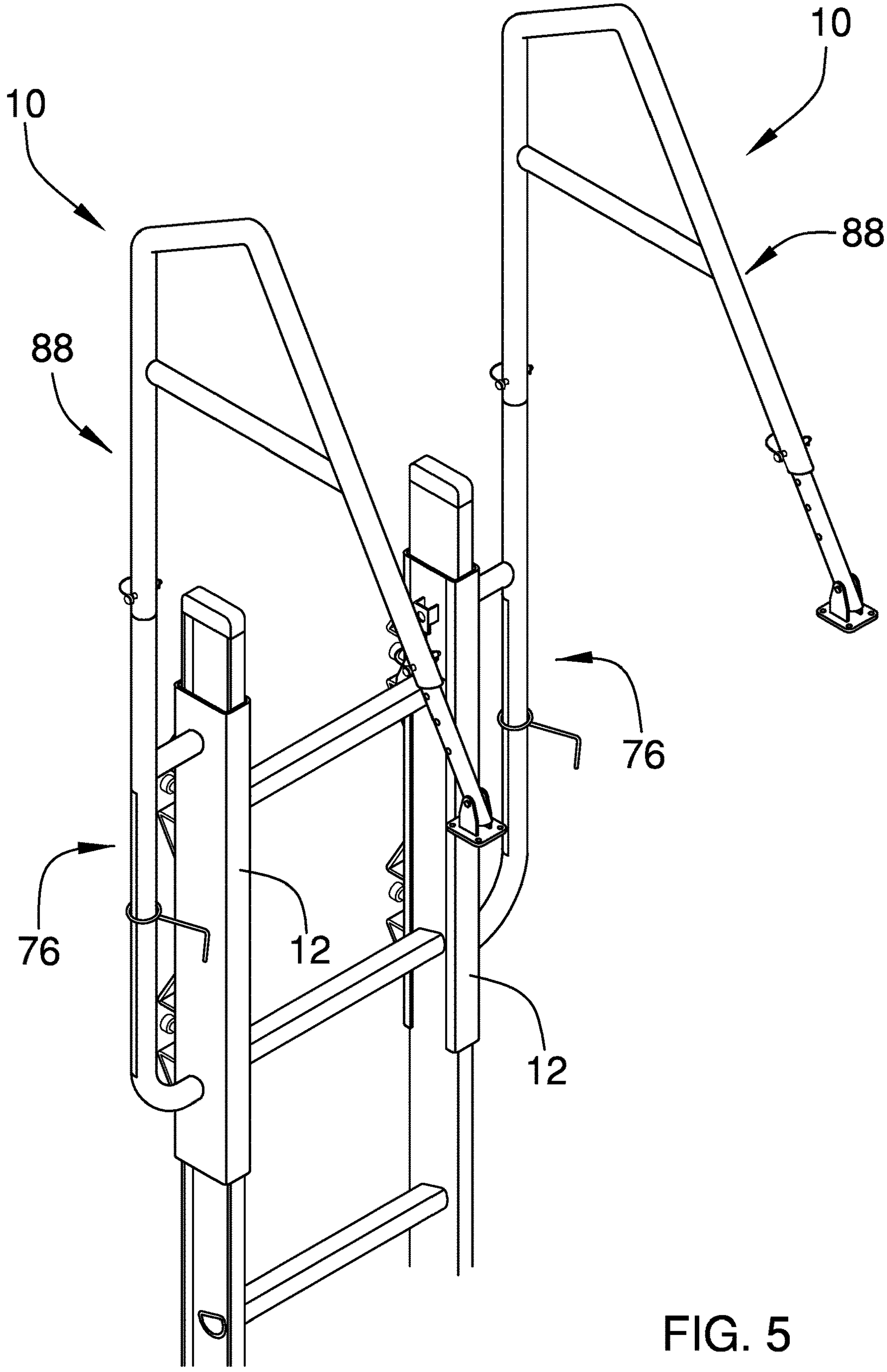
FIG. 5 is a top front side perspective view of an embodiment of the disclosure.
Figure 6:
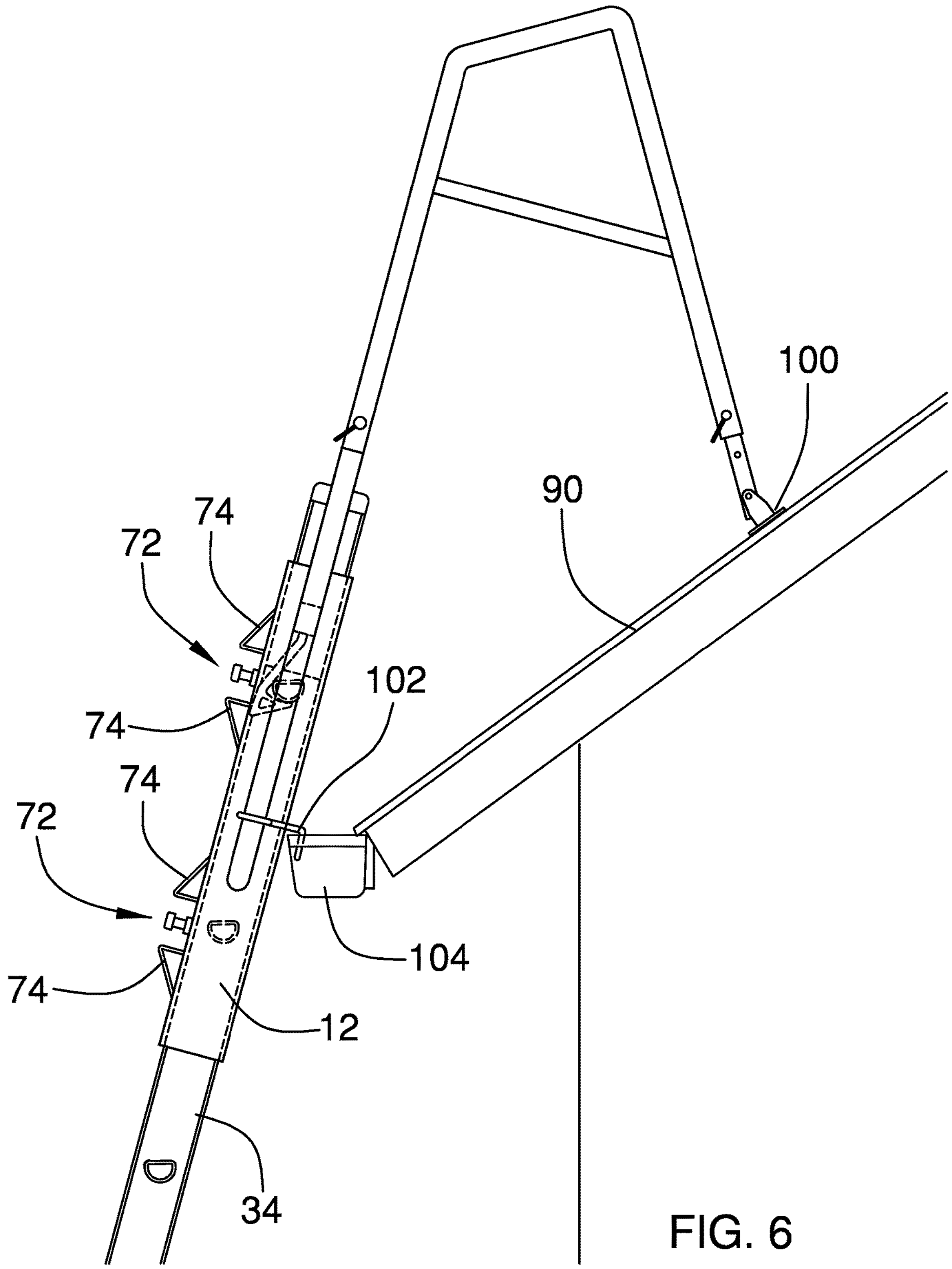
FIG. 6 is a side view of an embodiment of the disclosure in use.

With reference now to the drawings, and in particular to FIGS. 1 through 6 thereof, a new ladder stabilizing device embodying the principles and concepts of an embodiment of the disclosure and generally designated by the reference numeral 10 will be described.

As best illustrated in FIGS. 1 through 6, the ladder stabilizer attachment device 10 generally comprises a sleeve 12 including an outer wall 14. The outer wall 14 has an outer face 16, an inner face 18, an upper end 20, and a lower end 22. The lower end 22 is open. The outer wall 14 of the sleeve 12 has opposed side faces 24 extending between the inner face 18 and the outer face 16 and between the upper end 20 and the lower end 22. A slot 26 extends into the inner face 18 from the lower end 22 such that the sleeve 12 is shaped to receive a top end 28 of a ladder side rail 30 and an uppermost rung 32 of a ladder 34 into the slot 26. A top edge 36 of the slot 26 defines a stop 38 whereby the stop 38 is positioned to rest upon the uppermost rung 32 of the ladder 34 when the ladder 34 is fully inserted into the lower end 22 of the sleeve 12.

A coupler 40 is mounted to the sleeve 12. The coupler 40 is configured to releasably engage the uppermost rung 32 of the ladder 34 preventing the sleeve 12 from detaching from the ladder 34. The coupler 40 is pivotally mounted on the inner face 18 of the sleeve 12. The coupler 40 comprises a shaft 42 having an attached end 44 rotatably coupled to the sleeve 12 and a distal end 46 relative to the attached end 44. A projection 48 extends from the shaft 42 adjacent to the distal end 46 to define a hook 50 configured for extending under the uppermost rung 32 of the ladder 34. The projection 48 has ends 52 coupled to the shaft 42 to define an opening 54 in the coupler 40 adjacent to the distal end 46 of the shaft 42. The projection 48 comprises a bearing surface 56 extending away from the distal end 46 of the shaft 42 and towards the attached end 44 of the shaft 42. Thus, the bearing surface 56 is angled relative to the shaft 42 such that the coupler 40 is configured to pivot as the bearing surface 56 abuts the uppermost rung 32 of the ladder 34 as the sleeve 12 is positioned onto the ladder 34. An upper surface 58 of the projection 48 is concave to facilitate extension under the uppermost rung 32 of the ladder 34. The concavity of the upper surface 58 also inhibits pivoting of the coupler 40 out of engagement with the uppermost rung 32. A biasing member 60 is coupled to the sleeve 12 and engages the coupler 40 wherein the biasing member 60 is configured to urge the coupler 40 into engagement with the uppermost rung 32 of the ladder 34.

A first aperture 62 extends through a first one 24A of the opposed side faces 24. The first aperture 62 is threaded. A first locking member 64 is insertable through the first aperture 62 wherein the first locking member 64 is configured to engage the ladder side rail 30 to inhibit movement of the ladder side rail 30 relative to the sleeve 12. The first locking member 64 is threaded complementary to the first aperture 62. Similarly, a second aperture 66 extends through the first one 24A of the opposed side faces 24. The second aperture 66 is spaced from the first aperture 62. The second aperture 66 is threaded. A second locking member 68 is insertable through the second aperture 66 wherein the second locking member 68 is configured to engage the ladder side rail 30 to inhibit movement of the ladder side rail 30 relative to the sleeve 12. The second locking member 68 is threaded complementary to the second aperture 66. The second locking member 68. Each of the first locking member 64 and the second locking member 68 has a respective head 70 exposed outside of the sleeve 12.

Each of a plurality of guards 72 is coupled to the first one 24A of the opposed side faces 24. Each guard 72 is positioned proximate to an associated one of the first locking member 64 and the second locking member 68 such that each guard 72 is configured to inhibit unintentional contact with the head 70 of the associated one of the first locking member 64 and the second locking member 68. A distance each guard 72 extends from the first one 24A of the opposed side faces 24 is greater than a distance of the head 70 of the associated one of the first locking member 64 and the second locking member 68 when the associated one of the first locking member 64 and the second locking member 68 is inserted into a respective one of the first aperture 62 and the second aperture 66. Each guard comprises a pair of angle members 74. The angle members 74 are spaced on the first one 24A of the opposed side faces 24 and positioned on opposite sides of a respective one of the first aperture 62 and the second aperture 66.

A stabilizer mount 76 is attached to the sleeve 12. The stabilizer mount 76 extends outwardly from the outer face 16 of the outer wall 14 of the sleeve 12. The stabilizer mount 76 comprises a tube 78 having a bottom end 80 coupled to the sleeve 12. The tube 78 has a bend 82 such that an upper section 84 of the tube 78 extends spaced and parallel to the sleeve 12. A brace 86 is coupled to and extends between the outer surface 16 of the outer wall 14 of the sleeve 12 and the upper section 84 of the tube 78. A stabilizer 88 is couplable to the stabilizer mount 76 such that the stabilizer 88 is positionable on a roof 90 to stabilize the ladder 34. The stabilizer 88 extends upwardly and forwardly of the sleeve 12. The stabilizer 88 comprises an arm 92 attachable to the stabilizer mount 76 to extend forward and upwardly from the stabilizer mount 76. The arm 92 has a distal end 94 with respect to the stabilizer mount 76. A leg 96 is attached to the arm 92 extending forward and downwardly from the distal end 94. The leg 96 has a free end 98. A foot 100 is pivotally attached to the free end 98 for abutting the roof 90. A catch 102 is coupled to the stabilizer mount 76 and is configured to engage a gutter 104 positioned on the roof 90. The catch 102 includes a loop 106 extending around the tube 78 with an L-shaped extension 108 from the loop 106 such that the extension 108 can extend over and into the gutter 104.

In use, the sleeve 12 is placed onto the ladder 34 and the coupler 40 is positioned to secure the sleeve 12 on the ladder 34. To further stabilize the sleeve and prevent movement of the ladder side rail 30 within the sleeve 12, the first locking member 64 is tightened. Where present, the second locking member 68 is also tightened to further stabilize the ladder side rail 30 within the sleeve 12. The stabilizer 88 is attached to the stabilizer mount 76 and can be adjusted to fit the specific roof 90. A second sleeve 12 is placed onto a second ladder side rail such that a pair of the described devices 10 are used together to safely attach two stabilizers 88 to the ladder 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A ladder stabilizer attachment device configured to releasably engage a ladder and be abutted against a roof, the device comprising:

a sleeve including an outer wall, the outer wall having an outer face, an inner face, an upper end, and a lower end, the lower end being open;

a slot extending into the inner face from the lower end wherein the sleeve is configured to receive a top end of a ladder side rail and an uppermost rung of the ladder into the slot, a top edge of the slot defining a stop whereby the stop is configured to rest upon the uppermost rung of the ladder; and a coupler being mounted to the sleeve, the coupler being configured to releasable engage the uppermost rung of the ladder, the coupler being pivotally mounted on the inner face of the sleeve, wherein the coupler comprises a shaft having an attached end rotatably coupled to the sleeve and a distal end relative to the attached end;, and a projection extending from the shaft adjacent to the distal end to define a hook configured for extending under the uppermost rung of the ladder, the projection having ends coupled to the shaft to define an opening in the coupler adjacent to the distal end of the shaft.

2. The ladder stabilization attachment device of claim 1, further comprising the projection comprising a bearing surface extending away from the distal end of the shaft and towards the attached end of the shaft wherein the bearing surface is angled relative to the shaft such that the coupler is configured to pivot as the bearing surface abuts the uppermost rung of the ladder as the sleeve is positioned onto the ladder.

3. The ladder stabilization attachment device of claim 1, further comprising an upper surface of the projection being concave.

4. The ladder stabilization attachment device of claim 1, further comprising a biasing member coupled to the sleeve and engaging the coupler wherein the biasing member is configured to urge the coupler into engagement with the uppermost rung of the ladder.

5. The ladder stabilization attachment device of claim 1, further comprising:
- the outer wall of the sleeve having opposed side faces extending between the inner face and the outer face and between the upper end and the lower end;
- an aperture extending through a first one of the opposed side faces; and
- a locking member insertable through the aperture wherein the locking member is configured to engage the ladder side rail to inhibit movement of the ladder side rail relative to the sleeve.

6. The ladder stabilization attachment device of claim 5, further comprising:
- the aperture being threaded; and
- the locking member being threaded complementary to the aperture.

7. The ladder stabilization attachment device of claim 6, further comprising:
- the locking member having a head exposed outside of the sleeve; and
- a guard coupled to the first one of the opposed side faces, the guard being positioned proximate to the locking member such that the guard is configured to inhibit unintentional contact with the head of the locking member.

8. The ladder stabilization attachment device of claim 5, further comprising:
- the aperture being a first aperture extending through the first one of the opposed side faces;
- the locking member being a first locking member insertable through the first aperture;
- a second aperture extending through the first one of the opposed side faces, the second aperture being spaced from the first aperture; and
- a second locking member being insertable through the second aperture wherein the second locking member is configured to engage the ladder side rail to inhibit movement of the ladder side rail relative to the sleeve.

9. The ladder stabilization attachment device of claim 1, further comprising a stabilizer mount being attached to the sleeve.

10. The ladder stabilization attachment device of claim 9, further comprising the stabilizer mount extending outwardly from the outer face of the outer wall of the sleeve.

11. The ladder stabilization attachment device of claim 9, further comprising a stabilizer coupled to the stabilizer mount wherein the stabilizer is positionable on a roof to stabilize the ladder, the stabilizer extending upwardly and forwardly of the sleeve.

12. The ladder stabilization attachment device of claim 11, wherein the stabilizer comprises:
- an arm being attached to the stabilizer mount and extending forward and upwardly from the stabilizer mount, the arm having a distal end with respect to the stabilizer mount; and
- a leg being attached to the arm and extending forward and downwardly from the distal end, the leg having a free end.

13. The ladder stabilization attachment device of claim 9, further comprising a catch coupled to the stabilizer mount and being configured to engage a gutter positioned on the roof.

14. The ladder stabilization attachment device of claim 1, further comprising:
- the outer wall of the sleeve having opposed side faces extending between the inner face and the outer face and between the upper end and the lower end;
  - the projection comprising a bearing surface extending away from the distal end of the shaft and towards the attached end of the shaft wherein the bearing surface is angled relative to the shaft such that the coupler is configured to pivot as the bearing surface abuts the uppermost rung of the ladder as the sleeve is positioned onto the ladder, an upper surface of the projection being concave;
- a biasing member coupled to the sleeve and engaging the coupler wherein the biasing member is configured to urge the coupler into engagement with the uppermost rung of the ladder;
- a first aperture extending through the first one of the opposed side faces, the first aperture being threaded;
- a first locking member insertable through the first aperture wherein the locking member is configured to engage the ladder side rail to inhibit movement of the ladder side rail relative to the sleeve, the first locking member being threaded complementary to the first aperture;
- a second aperture extending through the first one of the opposed side faces, the second aperture being spaced from the first aperture, the second aperture being threaded;
- a second locking member being insertable through the second aperture wherein the second locking member is configured to engage the ladder side rail to inhibit movement of the ladder side rail relative to the sleeve, the second locking member being threaded complementary to the second aperture, the second locking member having a head exposed outside the sleeve;
- wherein each of the first locking member and the second locking member has a respective head exposed outside of the sleeve;
- a plurality of guards, each guard being coupled to the first one of the opposed side faces, each guard being positioned proximate to an associated one of the first locking member and the second locking member such that each guard is configured to inhibit unintentional contact with the head of the associated one of the first locking member and the second locking member, a distance each guard extends from the first one of the opposed side faces being greater than a distance of the head of the associated one of the first locking member and the second locking member when the associated one of the first locking member and the second locking member is inserted into a respective one of the first aperture and the second aperture, wherein each guard comprises a pair of angle members, the angle members being spaced on the first one of the opposed side faces and positioned on opposite sides of a respective one of the first aperture and the second aperture;

a stabilizer mount being attached to the sleeve, the stabilizer mount extending outwardly from the outer face of the outer wall of the sleeve, wherein the stabilizer mount comprises a tube having a bottom end coupled to the sleeve, the tube having a bend such that an upper section of the tube extends spaced and parallel to the sleeve, and a brace coupled to and extending between the outer surface of the outer wall of the sleeve and the upper section of the tube;

a stabilizer coupled to the stabilizer mount wherein the stabilizer is positionable on a roof to stabilize the ladder, the stabilizer extending upwardly and forwardly of the sleeve, wherein the stabilizer comprises an arm being attached to the stabilizer mount and extending forward and upwardly from the stabilizer mount, the arm having a distal end with respect to the stabilizer mount, and a leg being attached to the arm and extending forward and downwardly from the distal end, the leg having a free end; and a catch coupled to the stabilizer mount and being configured to engage a gutter positioned on the roof.

15. A ladder stabilizer attachment device configured to releasably engage a ladder and be abutted against a roof, the device comprising:

a sleeve including an outer wall, the outer wall having an outer face, an inner face, an upper end, and a lower end, the lower end being open;

a slot extending into the inner face from the lower end wherein the sleeve is configured to receive a top end of a ladder side rail and an uppermost rung of the ladder into the slot, a top edge of the slot defining a stop whereby the stop is configured to rest upon the uppermost rung of the ladder;

a coupler being mounted to the sleeve, the coupler being configured to releasable engage the uppermost rung of the ladder;

the outer wall of the sleeve having opposed side faces extending between the inner face and the outer face and between the upper end and the lower end;

an aperture extending through a first one of the opposed side faces, the aperture being threaded;

a locking member insertable through the aperture wherein the locking member is configured to engage the ladder side rail to inhibit movement of the ladder side rail relative to the sleeve, the locking member being threaded complementary to the aperture, the locking member having a head exposed outside of the sleeve;

a guard coupled to the first one of the opposed side faces, the guard being positioned proximate to the locking member such that the guard is configured to inhibit unintentional contact with the head of the locking member; and wherein the guard comprises a pair of angle members, the angle members being spaced on the first one of the opposed side faces and positioned on opposite sides of the aperture.

16. The ladder stabilization attachment device of claim 15, further comprising a distance each guard extends from the first one of the opposed side faces being greater than a distance of the head of the locking member when the locking member is inserted into the aperture.

17. A ladder stabilizer attachment device configured to releasably engage a ladder and be abutted against a roof the device comprising:

a sleeve including an outer wall, the outer wall having an outer face, an inner face, an upper end, and a lower end, the lower end being open;

a slot extending into the inner face from the lower end wherein the sleeve is configured to receive a top end of a ladder side rail and an uppermost rung of the ladder into the slot, a top edge of the slot defining a stop whereby the stop is configured to rest upon the uppermost rung of the ladder;

a coupler being mounted to the sleeve, the coupler being configured to releasable engage the uppermost rung of the ladder;

a stabilizer mount being attached to the sleeve, the stabilizer mount extending outwardly from the outer face of the outer wall of the sleeve; and wherein the stabilizer mount comprises a tube having a bottom end coupled to the sleeve, the tube having a bend such that an upper section of the tube extends spaced and parallel to the sleeve; and a brace coupled to and extending between the outer surface of the outer wall of the sleeve and the upper section of the tube.

* * * * *